US005410795A

United States Patent [19]

Derton et al.

[11] Patent Number: 5,410,795

[45] Date of Patent: May 2, 1995

[54] METHOD OF ASSEMBLY AND APPARATUS FOR A SCREEN IN A CENTRIFUGAL SEPARATOR

[75] Inventors: Harry E. Derton, East Carondelet, Ill.; Dewey M. Cope, Affton, Mo.

[73] Assignee: Centrifugal & Mechanical Industries, Inc., St. Louis, Mo.

[21] Appl. No.: 133,908

[22] Filed: Oct. 12, 1993

[51] Int. Cl.[6] .......................... B23P 6/00; B04B 1/04

[52] U.S. Cl. .............................. 29/402.15; 29/402.01; 29/402.14; 210/373; 210/380.1; 210/232; 494/36

[58] Field of Search ..................... 210/360.1, 369, 372, 210/377, 380.1, 232; 494/36; 29/402.01, 402.09, 402.14, 402.15, 163.8, DIG. 72

[56] References Cited

U.S. PATENT DOCUMENTS 1,334,023 3/1920 Elmore .
1,664,769 4/1928 Chance .
1,903,795 4/1933 Rigler .
2,370,353 2/1945 Howe .
2,727,631 12/1955 Pate .
2,752,043 6/1956 Van Riel .
3,074,842 1/1963 Strong .
3,289,843 12/1966 Nyrop .
3,315,810 4/1967 Humphrey et al. .
3,361,264 1/1968 Quetsch .
3,411,631 11/1968 Elsken et al. .
3,438,501 4/1969 Oyen .
3,837,913 9/1974 Hillebrand et al. .
4,135,659 1/1979 Derton et al. .
4,157,966 6/1979 Hassall .
4,922,625 5/1990 Farmer .
4,961,722 10/1990 Taylor et al. .
5,275,727 1/1994 Nemed ................................ 210/373

*Primary Examiner*—Joseph W. Drodge
*Assistant Examiner*—David Reifsnyder
*Attorney, Agent, or Firm*—Paul M. Denk

[57] ABSTRACT

In a centrifugal separator having a vertical drive mechanism including a drive shaft, a flight assembly attached to the drive shaft, a frustoconical screen assembly around the flight assembly driven by the drive mechanism and a rounded support basket to seat the screen, a method of assembling the screen within the basket. The method includes inserting the screen in the basket, pulling the screen upward to achieve a rounded condition, attaching the lower part of the screen to the lower part of the basket, and attaching the upper part of the screen to the upper part of the basket by tightening bolts.

6 Claims, 3 Drawing Sheets

METHOD OF ASSEMBLY AND APPARATUS FOR A SCREEN IN A CENTRIFUGAL SEPARATOR

BACKGROUND OF THE INVENTION

This invention relates to centrifugal separators and, more particularly, to the improvement in a method of installing the frustoconical screen in a vertical centrifugal separator so as to achieve optimal rounding of the screen.

Centrifugal separators are widely used in a variety of industrial processes requiring material separation. A variety of centrifugal separators, both vertical and horizontal, are disclosed in the following U.S. Pat. Nos.: U.S. Pat. No. 4,135,659 to Derton et al.; U.S. Pat. No. 4,922,625 to Farmer; U.S. Pat. No. 1,903,795 to Rigler; U.S. Pat. No. 1,664,769 to Chance; U.S. Pat. No. 1,334,023 to Elmor; U.S. Pat. No. 2,752,043 to Vanriel; U.S. Pat. No. 2,727,631 to Pate; U.S. Pat. No. 2,370,353 to Howe; U.S. Pat. No. 3,361,264 to Quetsch; U.S. Pat. No. 3,315,810 to Humphrey et al.; U.S. Pat. No. 3,289,843 to Nyrop; U.S. Pat. No. 3,074,842 to Strong; U.S. Pat. No. 3,837,913 to Hillebrand et al.; U.S. Pat. No. 4,157,966 to Hassall; U.S. Pat. No. 3,411,631 to Elsken et al.; U.S. Pat. No. 4,961,722 to Taylor et al.; U.S. Pat. No. 3,418,097 to Dudley et al.; and U.S. Pat. No. 3,438,501 Oyen.

Centrifugal separators are generally constructed having vertical drive mechanism including a drive shaft. A flight assembly is attached to the drive shaft and rotatably driven. A frustoconical screen assembly, which includes a rotor, is also attached to the drive shaft. The screen rotor is driven at a separate speed as the flight assembly. The perforated frustoconical screen is positioned outwardly of the flight assembly. The material to be separated is placed in the centrifugal separator between the flight assembly and the screen and, in this area, the separation occurs.

Typically, material is fed into the top of the separator and placed in the area between the flight assembly and the screen but in contact with the flight. As the flight and the screen assembly spin at different rates, solid material is retained near the center of the assembly on the flight side of the screen while free liquids are slung off, by centrifugal force, through the screen to an outside area of the separator. The liquids are then collected in a collecting means and directed to a drain outlet. Solid materials fall under the force of gravity to the bottom of the separator where they are discharged and collected.

As is obvious from this general description of the operation of a centrifugal separator, the clearance between the flight and the frustoconical screen surface is critical to the efficient operation of the centrifugal separator. If the screen does not become rounded during installation, there can be large clearances between the flight and screen in some areas and the flight may actually touch the screen in other areas. Large gaps decrease the efficiency of the machine. Touching of the screen by the flight causes premature screen wear.

Generally, in assembly methods of the prior art, the frustoconical screen is placed around the top of the flight and pushed down over the flight into position. Some centrifugal separators have a basket frame to seat the screen. In the centrifugal separators employing the basket frame, the screen is pushed or forced down over the flight into the basket. The lower portion of the screen is then attached or clamped to the lower portion of the basket to secure it in place.

If the screen is stiff or rigid, it is difficult to achieve proper rounding of the screen when pushing it into position within the basket. Pushing the screen bends the screen toward the flight and decreases clearance in some areas. Furthermore, bar screens, for example, those manufactured by Bixby-Zimmer, Galesburg, Ill., and Johnson Filtration, St. Paul, Minn., are even more rigid and difficult to round into shape.

SUMMARY OF THE INVENTION

It is, therefore, a primary objective of the present invention to provide a method of installing a frustoconical screen in a centrifugal separator wherein the lower portion of the screen is fixed, and then an upper portion of the frustoconical screen is secured to an upper portion of the basket and the screen is then pulled into place to conform to the shape of the round basket.

Another object of the present invention is to provide a method of installing a frustoconical screen in a centrifugal separator which provides uniform clearance between the flight and the screen.

Yet another object of the invention is to provide a method of installing a frustoconical screen in a centrifugal separator which improves the screen's roundness after installation.

Briefly stated, a method of installing a frustoconical screen into a centrifugal separator in which the bottom portion of the screen is fixed, as by a bolt or clamp, and then the top portion of the screen is clamped or attached to a top portion of a basket support. The screen is pulled upwardly into place so that the screen conforms to the shape of the round basket support. The bottom portion of the screen is attached to the bottom portion of the basket frame to secure the screen in place creating a rounded screen with uniform clearance between the flight and the screen.

DESCRIPTION OF THE PREFERRED EMBODIMENT

Figure 1:
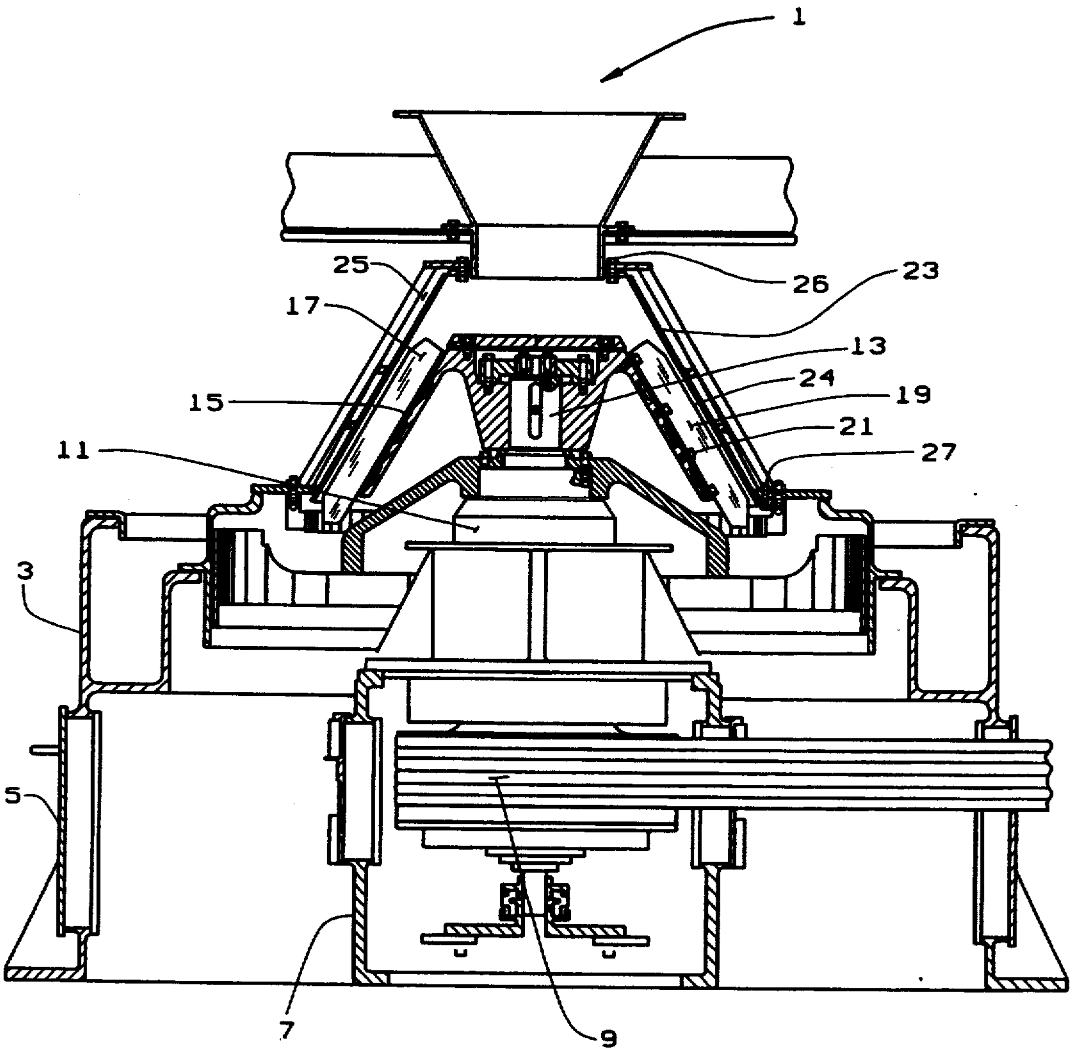
FIG. 1 is a cross-sectional, front elevation of a vertical centrifugal separator employing a frustoconical screen assembled according to the method of the present invention.

In referring to the drawings, in particular FIG. 1, there is disclosed a centrifugal separator of the present invention shown generally at 1. Separator 1 is of a generally conventional design having a main base 3 with a lower housing 5 having a drive housing 7 therein. Drive housing 7 covers a conventional belt or other drive assembly, shown generally at 9.

A conventional gear assembly 11 is mounted above drive assembly 9. A rotatable vertical drive shaft 13 extends out of and is operatively connected to gear assembly 11. Cone 15 is attached to shaft 13 and rotates therewith. A plurality of wiping flights, as at 17 and 19, are attached, as with bolts 21 or other appropriate attachment means, around cone 15. A frustoconical screen 23 is attached to and surrounds cone 15 leaving a space 24 between the flights and the screen.

Figure 3:
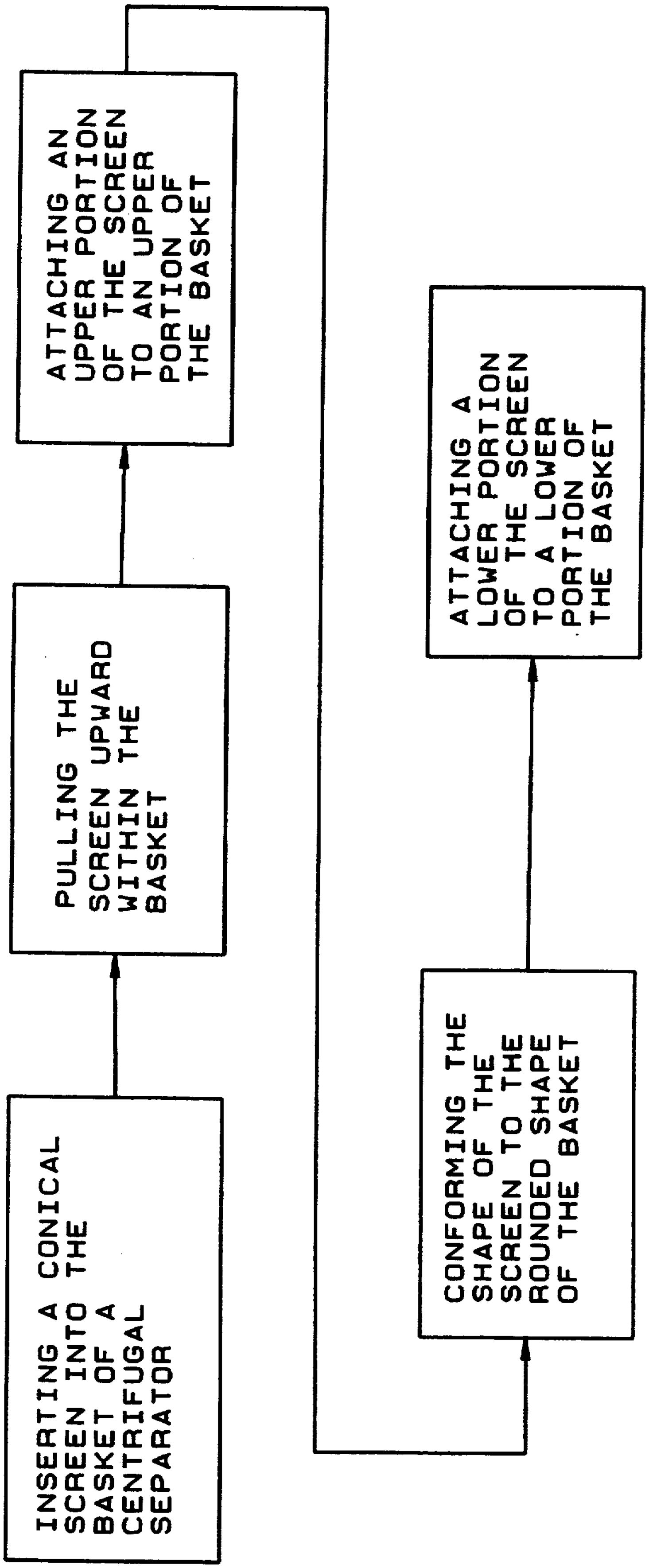
FIG. 3 is a block diagram illustrating the method of assembly of a frustoconical screen in a centrifugal separator.

A substantially frustoconical-shaped support basket 25 surrounds and supports screen 23. The top of screen 23 is attached to the top of basket 25 by bolts 26 or clamps or other appropriate attachment means. The bottom of screen 23 is attached to the bottom of support basket 25 by bolts 27 or clamps or other appropriate attachment means to hold screen 23 in place. A method of inserting the screen in the basket is best illustrated by FIG. 3.

During assembly of the separator of the present invention, the screen 23 is inserted in basket 25 and the top bolts are attached and tightened to pull the screen upward into the basket 25. The screen is pulled up into the basket 25. The force of pulling screen 23 upward forces screen 23 to conform to the rounded, frustoconical shape of basket 25. Creating an even and uniform space 24 between the flights and screen 23. The bottom is attached as by bolts 27.

Figure 2:
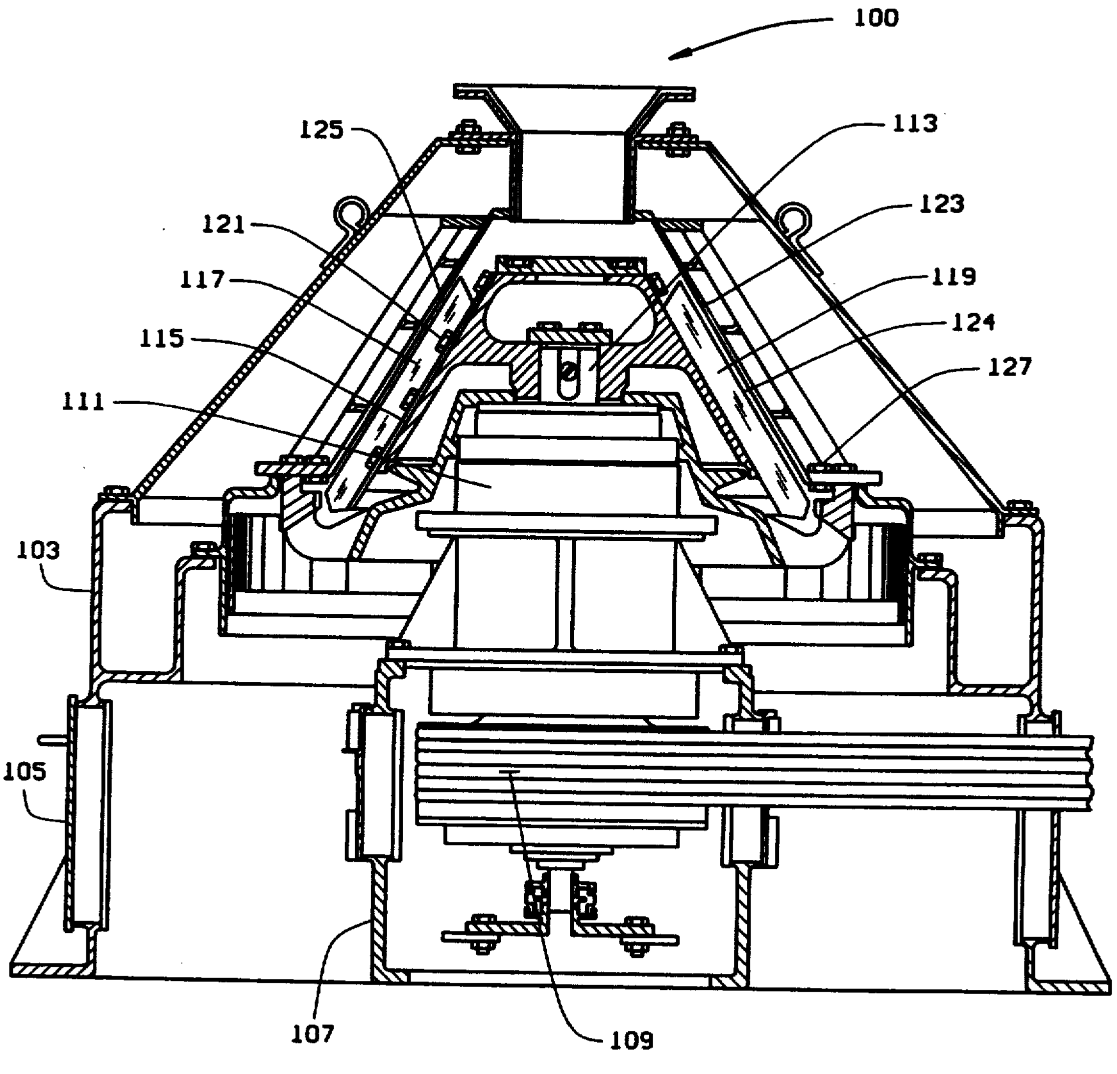
FIG. 2 PRIOR ART
FIG. 2 is a cross-sectional front elevation of a vertical centrifugal separator employing a frustoconical screen assembled according to a prior art method of assembly.

FIG. 2 illustrates a prior art centrifugal separator shown generally by reference numeral 100. Separator 100 has a main base 103, a lower housing 105, and a drive housing 107 inside housing 105 which covers a conventional belt drive assembly, shown generally at 109.

A conventional gear assembly 111 is mounted above drive assembly 109. A rotatable vertical drive shaft 113 extends out of and is operatively connected to gear assembly 111. Cone 115 is attached to shaft 113. Wiping flights 117 and 119 are attached, as with bolts 121 or other appropriate attachment means, around cone 115. A frustoconical screen 123 is attached to and surrounds cone 115, with a space 124 between the flights and screen 123.

A substantially frustoconical-shaped support basket 123 surrounds and supports screen 123. The bottom of screen 123 is attached to the bottom of support basket 125 by bolts 127 or clamps or other appropriate attachment means to hold screen 121 in place.

During the assembly the prior art separator 100, screen 123 is forced up into support basket 125 and then bolted or attached at the bottom as with bolts 127 as previously described. With the prior art assembly, it is difficult to achieve proper rounding of the screen when pushing the screen into position in the basket. Pushing the screen bends and folds the screen towards the flight decreasing the clearance, as at 124, in discrete places around the cone and prevents the uniform rounding of screen 123. During rotation, flights 117,119 can strike the screen causing premature wear.

It will be apparent to those skilled in the art that various modifications can be made in the invention as previously described and illustrated in the accompanying drawings. Therefore, the foregoing description and accompanying drawings are intended to be viewed as illustrative and not to be viewed in a limiting sense.

Having described the invention, what is claimed and desired to be secured by Letters Patent is:

1. In a vertical centrifugal separator having a vertical drive mechanism including a drive shaft, a cone attached to the drive shaft, a flight assembly attached to the cone, a frustoconical screen around the flight assembly driven by the drive mechanism, and a rounded support basket to seat the screen in a fixed position within the basket, an improvement in the method of assembling the screen within the basket including the steps of:

inserting the screen vertically disposed into the basket;

said screen having an upper end and a lower end, and said basket having proximate upper and lower portions;

pulling the upper end of the screen upwardly into the basket thereby conforming the screen to the rounded support basket;

attaching the lower end of the screen to a lower portion of the basket; and attaching by bolts the proximate upper end of the screen to the proximate upper portion of the basket.

2. The method of claim 1 wherein the step of attaching the upper end of the screen to the proximate upper portion of the basket includes bolting the upper end of the screen to the proximate upper portion of the basket, and tightening the same.

3. The method of claim 1 wherein the step of attaching the upper end of the screen to the proximate upper portion of the basket includes clamping the upper end of the screen to the proximate upper portion of the basket.

4. The method of claim 1 wherein the step of attaching the lower end of the screen to a proximate lower portion of the basket including bolting the lower end of the screen to the proximate lower portion of the basket.

5. The method of claim 1 wherein the step of attaching the lower end of the screen to the proximate lower portion of the basket includes clamping the lower end of the screen to the proximate lower portion of the basket.

6. In a vertical centrifugal separator having a vertical drive mechanism including a drive shaft, a rotor connected to the drive shaft, a flight assembly attached to the rotor, a support basket around the flight assembly, and a frustoconical screen driven by the drive mechanism seated in the basket, an improvement in the method of assembling the screen within the basket including the steps of:

inserting the screen vertically disposed into the basket;

said screen having an upper end and a lower end, and said basket having proximate upper and lower portions;

pulling the upper end of the screen upwardly into the basket, thereby conforming the screen within the basket to improve the roundness of the screen;

clamping a lower end of the screen to the proximate lower portion of the basket; and clamping the upper end of the screen to the proximate upper portion of the basket.

* * * * *